March 31, 1953 W. BRUCKNER 2,633,206

METHOD AND APPARATUS FOR ACTUATING DUST COLLECTORS

Filed Oct. 12, 1950 7 Sheets-Sheet 1

INVENTOR.
WALTER BRUCKNER
BY
Bates, Teare, & McBean
ATTORNEYS

March 31, 1953 W. BRUCKNER 2,633,206

METHOD AND APPARATUS FOR ACTUATING DUST COLLECTORS

Filed Oct. 12, 1950 7 Sheets-Sheet 2

INVENTOR.
WALTER BRUCKNER
BY
Bates, Teare, & McBean
ATTORNEYS

METHOD AND APPARATUS FOR ACTUATING DUST COLLECTORS

Filed Oct. 12, 1950 7 Sheets-Sheet 3

INVENTOR.
WALTER BRUCKNER
BY
Bates, Teare & McBean
ATTORNEYS

March 31, 1953 W. BRUCKNER 2,633,206

METHOD AND APPARATUS FOR ACTUATING DUST COLLECTORS

Filed Oct. 12, 1950 7 Sheets-Sheet 4

NORMAL OPEN CONDITION OF CIRCUITS

INVENTOR.
WALTER BRUCKNER
BY Bates, Teare & McBean
ATTORNEYS

METHOD AND APPARATUS FOR ACTUATING DUST COLLECTORS

Filed Oct. 12, 1950 7 Sheets-Sheet 5

TIMER OPERATING CIRCUIT

HOLDING CIRCUIT

INVENTOR.
WALTER BRUCKNER
BY
Bates, Teare, & McBean
ATTORNEYS

METHOD AND APPARATUS FOR ACTUATING DUST COLLECTORS

Filed Oct. 12, 1950 7 Sheets-Sheet 6

INVENTOR.
WALTER BRUCKNER
BY
Bates, Teare, & McBean
ATTORNEYS

METHOD AND APPARATUS FOR ACTUATING DUST COLLECTORS

Filed Oct. 12, 1950 7 Sheets-Sheet 7

INVENTOR.
WALTER BRUCKNER
BY
Bates, Teare, & McBean
ATTORNEYS

Patented Mar. 31, 1953 2,633,206

UNITED STATES PATENT OFFICE 2,633,206

METHOD AND APPARATUS FOR ACTUATING DUST COLLECTORS

Walter Bruckner, Garfield Heights, Ohio, assignor to The Northern Blower Company, Cleveland, Ohio, a corporation of Ohio Application October 12, 1950, Serial No. 189,755

11 Claims. (Cl. 183—54)

This invention relates to a dust collector system of the type wherein there are a number of compartments each containing fabric bags with means for directing dust-laden air into the bags and for drawing the air out of the compartment from the exterior of the bags, with the result that the dust is deposited on the interior of the bags. In such systems it is necessary to shake the bags from time to time to clear the dust clinging to the interior and deposit the same in a suitable receptacle for ultimate discharge.

This invention is concerned with automatically actuated means for shaking the bags of the different compartments as such operation may be required. I determine the time of initiating the shaking operation by the relation of the air pressure within the bag to that outside of the bag. As the dust builds up in the bag the differential between internal and external pressure increases, and in my invention I avail myself of this increase of differential pressure to actuate mechanism to set in operation power means which shakes the bags. The same actuation also operates valve mechanism to reverse the direction of flow of the air, so that it may now pass from the exterior of the bags into the interior and assist in loosening the dust in the bags.

My invention includes such a method of automatically controlling the shaking of the bags in any compartment, and, as it is desirable that the shaking occur in only one compartment at a time, my invention includes also provision for preventing at that time the operation of the shaking means for the other compartments, all as hereinafter explained.

The invention also includes suitable apparatus for use in carrying out the above-outlined method. The drawings disclose two forms of such apparatus, each of which is included within my invention and which will be hereinafter described in detail.

Figure 1:
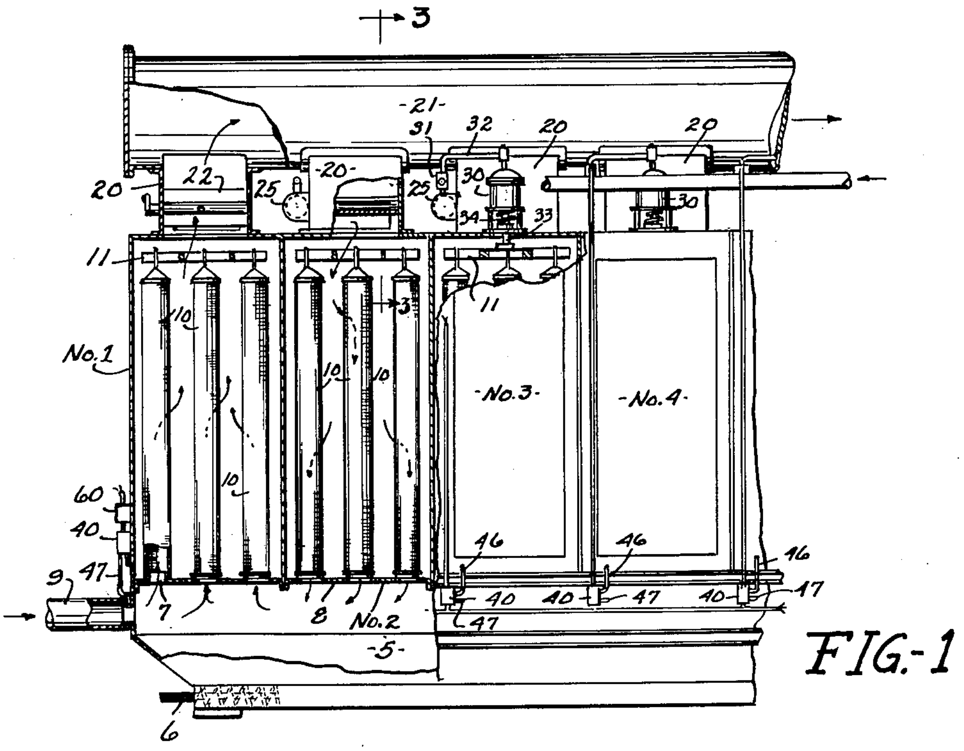
Figure 2:
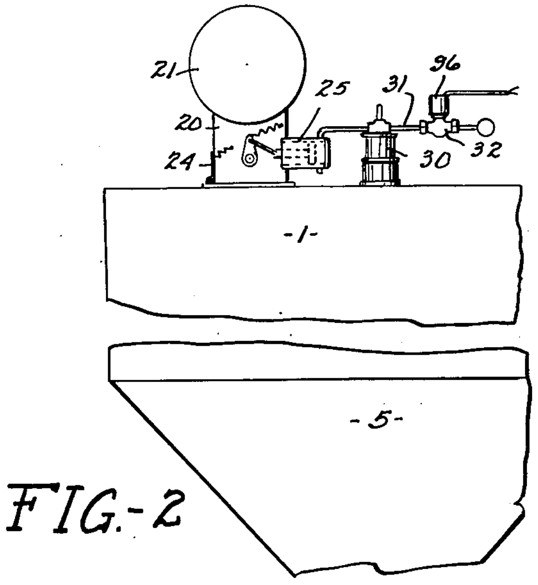
Figure 3:
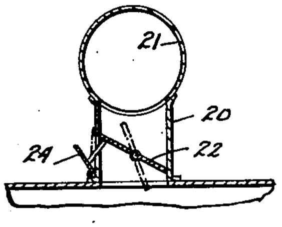
Figures 4, 5, 12:
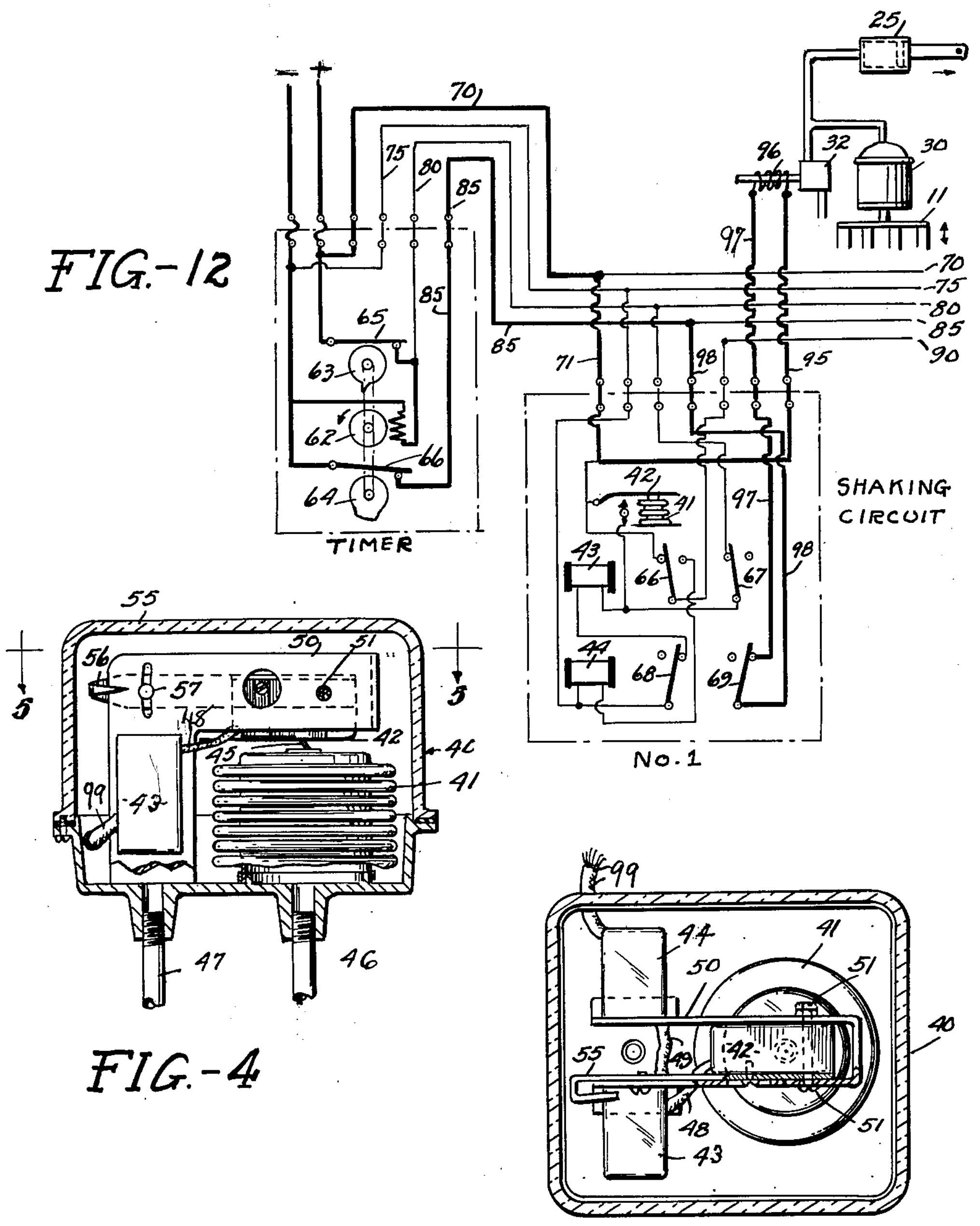
Figure 6:
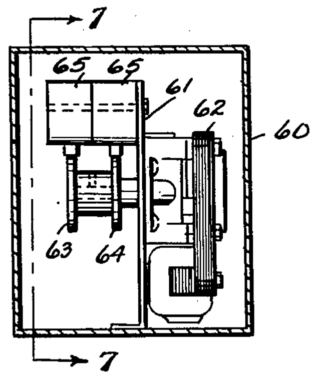
Figure 7:
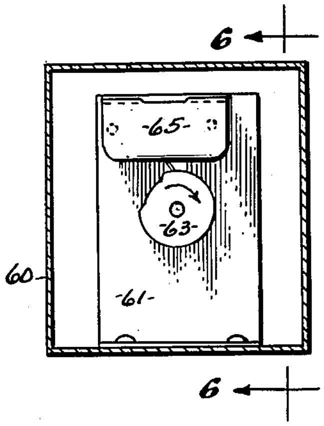
Figure 14:
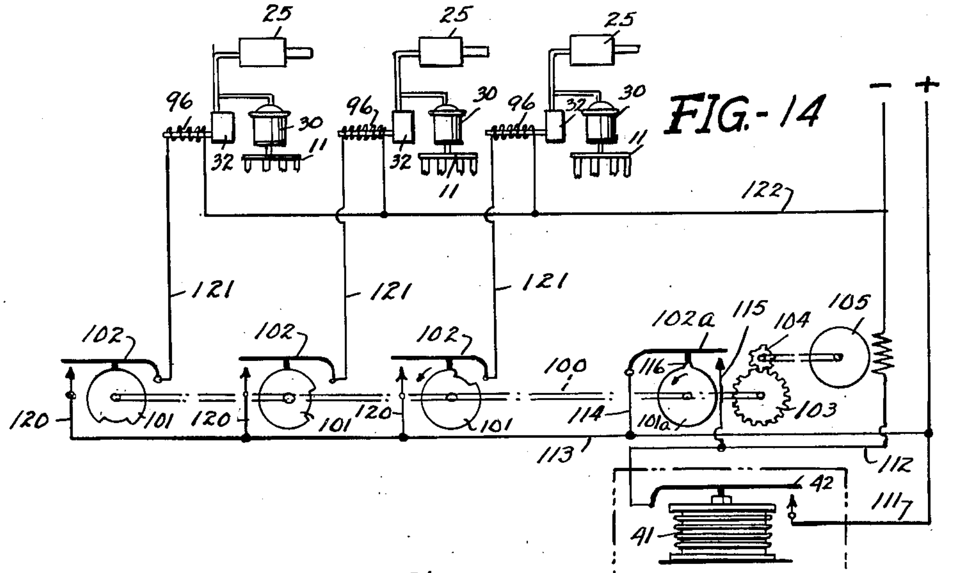
Figure 13:
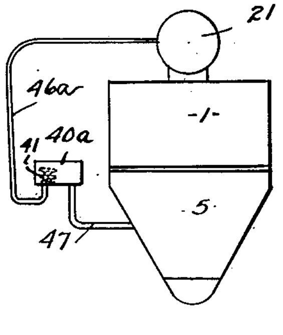
Figure 8:
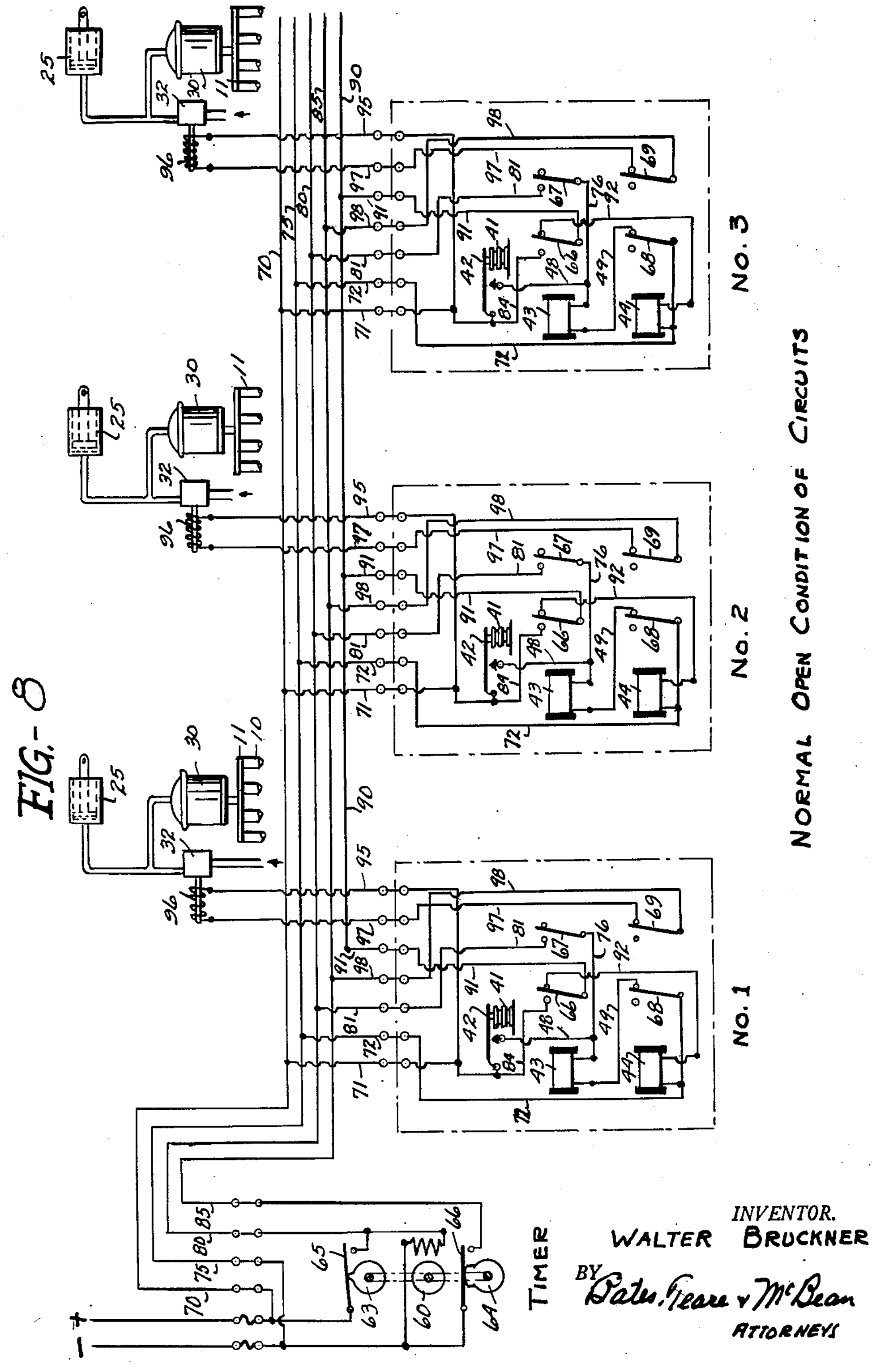
Figure 9:
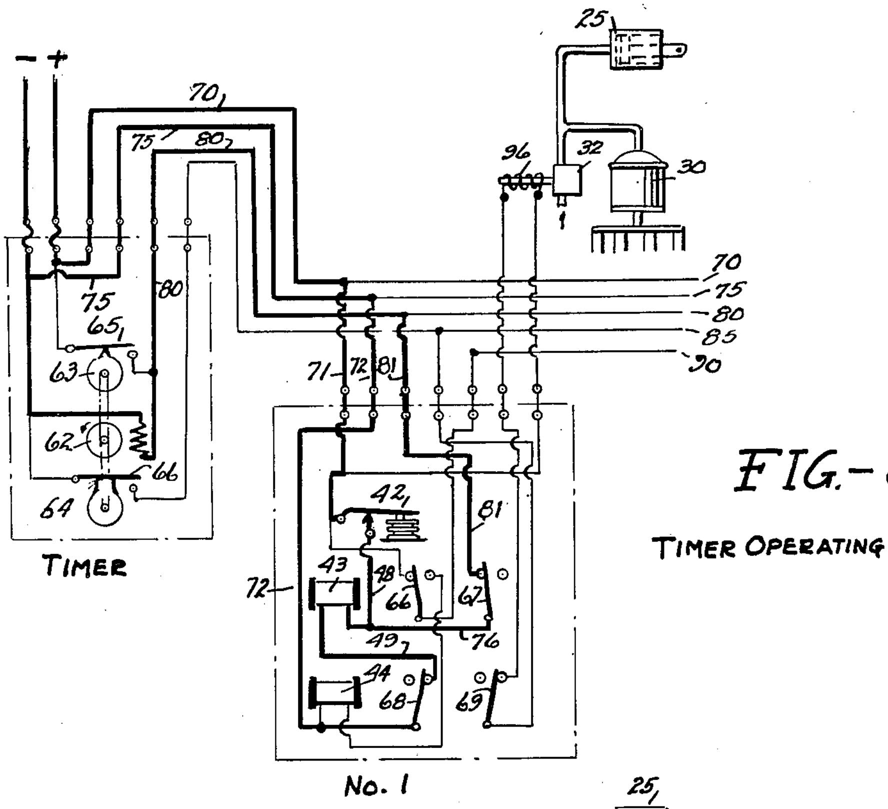
Figure 10:
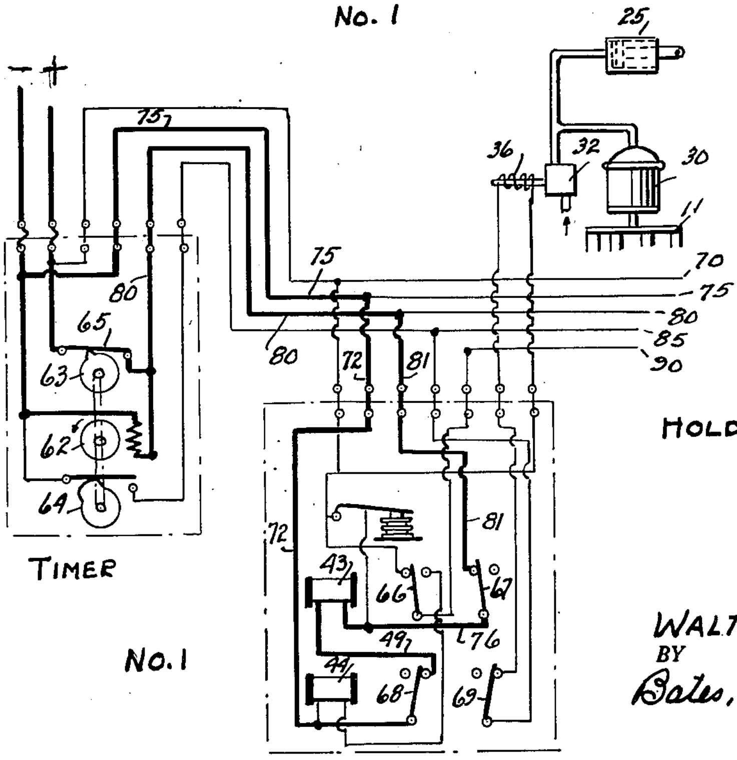
Figure 11:
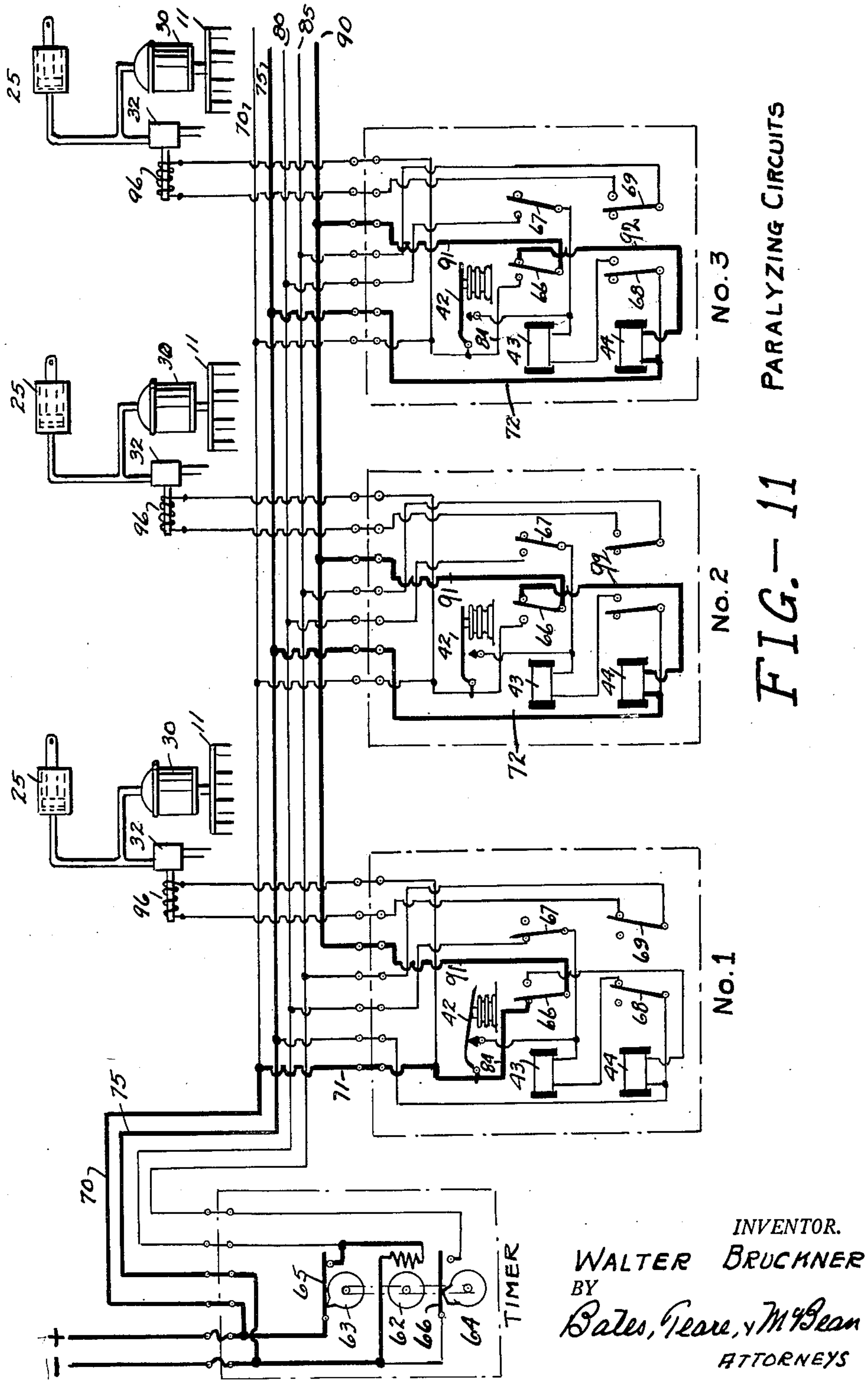
Figure 15:
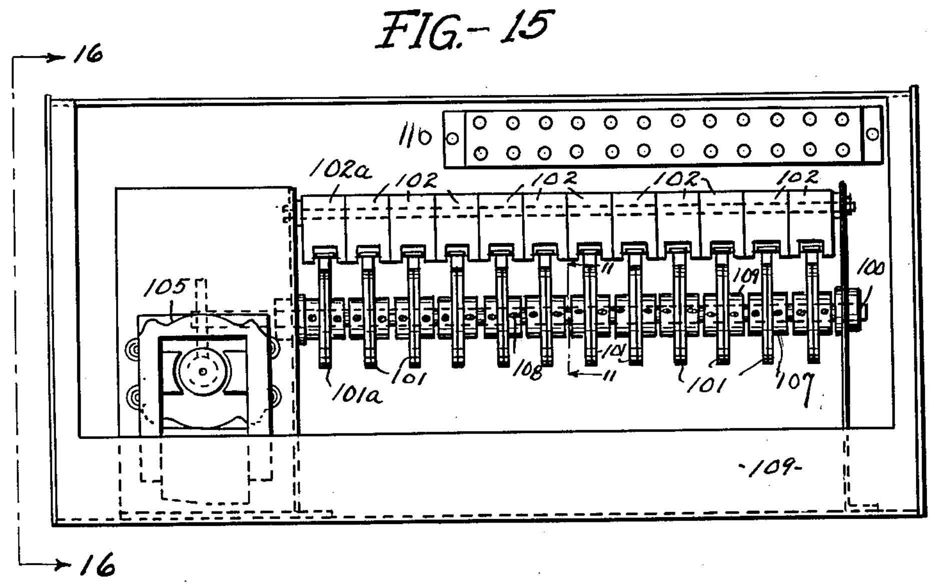
Figure 16:
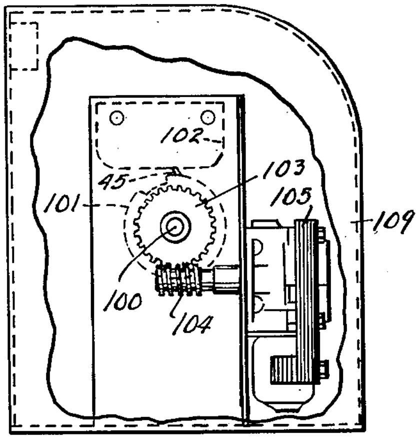
Figure 17:
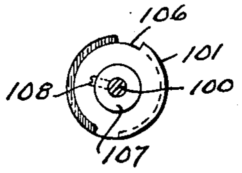

In the drawings, Fig. 1 is a front elevation partly broken away of a dust collector having several compartments controlled by the mechanism of this invention; Fig. 2 is a somewhat diagrammatic end elevation of the construction shown in Fig. 1, this view being intermediately broken out; Fig. 3 is a vertical section through the main suction passageway, as indicated by the line 3—3 on Fig. 1; Fig. 4 is a vertical section controlling device operated by the differential pressure at the bags; Fig. 5 is a sectional plan of such controlling device, the plane of the section being indicated by the line 5—5 on Fig. 4; Figs. 6 and 7 are elevations of the timer for controlling the duration of the shaking operation, these views being sections through the casing about the timer, the plane of the section for each view being indicated by the correspondingly numbered lines on the other; Fig. 8 is a diagram of the electric circuits and pneumatic operators controlling the shaking operation of three compartments, the position of the parts being that of the normal dust collecting operation of all units of the system; Fig. 9 is a diagram similar to a portion of Fig. 8, illustrating by heavy lines, the particular circuit brought into action by the existence of a predetermined pressure differential in one unit which will result a few seconds later in the shaking of that unit; Fig. 10 is a diagram similar to Fig. 9, the position of the parts being the same as that of Fig. 9, but illustrating in heavy lines the circuit for holding the controlling circuit in its position; Fig. 11 is a diagram similar to Fig. 8 with the parts in the same position as that of Figs. 9 and 10, but illustrating in heavy lines the circuit for paralyzing the shaking circuits for all of the units except the one being shaken; Fig. 12 is a diagram illustrating the shaking circuit as established by the timer a few seconds after the establishment by the relay circuits of the timing circuit of Fig. 9; Fig. 13 is a diagrammatic end elevation somewhat similar to that of Fig. 2, but illustrating a dust collector equipped with a modified form of control; Fig. 14 is a diagram of the controlling operation of the modified form illustrating the electric and pneumatic mechanisms in their neutral position; Fig. 15 is an elevation of a combined timer and controller for the entire set of compartments as used in connection with the form of the invention shown in Fig. 13, with the cover plate and connecting wiring removed; Fig. 16 is an end elevation of the unit shown in Fig 14 with the cover partly broken away, the direction of the view being indicated by the line 16—16 on Fig. 15; Fig. 17 is a detail in sectional view, being indicated for instance by the line 17—17 on Fig. 15 and illustrating any one of the adjustable controlling cams.

It will be convenient to describe first such portion of the general shaking system illustrated in Figs. 1 to 3 and is in common use and then to take up my invention as applied thereto.

Figs. 1 and 2 disclose a dust collecting system having a number of separate compartments of which four are shown designated 1, 2, 3 and 4 respectively. The compartments are arranged in a row and beneath them all is a common receptacle or hopper 5 to receive the dust from the bags in the compartments, this hopper being equipped with a suitable screw conveyor 6 for discharging such dust.

In each compartment is a series of bags designated 10 which are attached at their lower ends to open collars 7 at the roof 8 of the hopper, the bags being thus open at their lower ends to the hopper. At their upper ends the group of bags in each compartment is connected to a frame 11 which is supported by the shaking mechanism hereinafter described so that the whole group of bags in any compartment may be shaken as a unit.

Above each compartment is a bonnet 20, which is a hollow box open at its lower end to the compartment and open at its upper end to a suction conduit 21 common to all of the compartments.

The suction through the compartments and hopper causes the dust-laden air to enter the upper portion of the hopper through a conduit 9 and thence pass upwardly through the open collars 7 into the interior of the bags 10, and then the cleaned air passing through the bags is withdrawn from the compartment by suction applied to the conduit 21. Thus the dust-laden air passes continuously into the hopper while the clean air passes continuously out of the compartments.

When the shaking operation is initiated, as hereinafter described, there is also simultaneously caused a change of position of a damper or air valve in the bonnet 20 for that compartment, resulting in the passageway from the compartment becoming disconnected from the main suction line 21 but open to the atmosphere. This damper is indicated in Fig. 3 as a swinging plate 22, one in each bonnet. Each damper may be operated by the piston in an air cylinder 25, Fig. 2, which is supplied by air from a conduit 31 and controlled by the same valve 32 which controls the shaker, as hereinafter explained. The exit from the bonnet to the outside atmosphere may be controlled by a hinged damper 24 linked to the damper 22, or otherwise operated in unison with it, to be opened whenever the damper is closed, as indicated in Fig. 3.

The bags may be shaken by any suitable mechanism individual to each compartment, but I prefer to cause the shaking by pneumatic mechanism which causes the bag supporting frame 11 to vibrate up and down. To that end, I have indicated cylinders 30, one for each compartment. Coupled at the upper ends of the cylinders is a conduit 31 adapted to contain air under pressure under the control of valves 32. Each cylinder contains a piston from which a rod 33 leads downwardly and is connected to the shaker frame 11. A spring 34 acting upwardly against the piston tends to elevate it and raise the shaker frame and maintain the bags taut. When air is admitted to the upper end of the cylinder above the piston it forces the piston downwardly against the action of the spring 34 to slacken the bags.

The construction within the shaking cylinder is not shown, but it is such that the admitted compressed air is alternately active and interrupted, resulting in alternate slackening and tightening of the bags which shakes the dust loose and allows it to drop into the hopper.

In some prior constructions it is customary to employ more than one set of bags, each with its corresponding shaking mechanism, for each compartment. For simplicity, I have shown but one set of bags and one set of shaking mechanism for each compartment, which is intended to be illustrative of any arrangement of one or more sets of bags in the compartment, each set having its own shaking mechanism.

So much of the general construction of the particular dust collector shown, as has been above described with reference to Figs. 1, 2 and 3, has been in use for a number of years, but heretofore it has been customary to operate manually the valves which control the shaking mechanisms and the reversals of the air. However, with such cleaning system, or any system, controlled according to my invention, the valves which control the shaking mechanisms are operated electrically and the current to such valve is controlled by a differential pressure device responsive both to the pressure within the bags and that on the exterior thereof.

This pressure responsive device is to the best of my knowledge entirely new with me and may be used for other operations than dust collecting and is so claimed in this application. Such mechanism, and the operation by it of a dust collector of the type illustrated, by connections which are included in my invention, will now be described.

In the embodiment shown particularly in Figs. 4 to 12, there is one pressure-operated control unit for each compartment. It comprises an air-tight casing 40 containing an extensible bellows 41, a micro-switch 42 operated by the bellows and a pair of relays 43 and 44, the first relay 43 being controlled by the micro-switch and the second relay 44 controlled by the first. Two air conduits 46 and 47 are provided, the first of which (46) leads to the interior of the bellows and the second (47) to the space in the casing 40 outside of the bellows. One of these conduits is connected with the space within the bags and the other with an air space outside of the bags.

In the modified apparatus indicated in Figs. 13 to 17, there is one differential pressure unit for the entire system and in this case the conduit 46 to the interior of the bellows is coupled to the general suction passageway for clean air designated 21. The conduit 47 from the exterior of the bellows is as before coupled to the hopper 5.

The normally expanded bellows 41 holds the switch operating lever 45 in idle position to leave the micro-switch contacts open. As the external pressure on the bellows increases the top of the bellows gradually sinks, so that the lever 45 which operates the micro-switch and bears against the top of the bellows is pushed down by the internal spring pressure in the micro-switch. This does not immediately close the switch but does close it as soon as the bellows has descended farther to allow the spring to push the lever still farther down.

The micro-switch 42 within the pressure unit is of any suitable construction. It is shown as carried within the parallel arms of a standard 50 and pivoted thereto at 51, Figs. 4 and 5. As stated, it has an operating member 45 bearing against the upper end of the bellows and spring pressed downwardly. When the bellows contracts due to the pressure within the bags (conveniently called the hopper pressure) exceeding the pressure on the bags' exterior (called the compartment pressure) such movement lowers the upper end of the bellows and thereby operates to close the circuit within the micro-switch.

Rigidly connected to the micro-switch body is an arm 55 pivoted at 51 and shiftable up-and-down at its free end 56, and locked in set position by a clamping screw 57. The raising of this arm carries the operating member 45 farther from the bellows so that a less contraction of the bellows will operate the switch; while a lowering of the arm end 56 will require a greater contraction. Thus I am able to vary the effective operating differential pressure as desired.

While I have shown the conduit 46 from within the bellows connected to the compartment space and the conduit 47 connected to the hopper space these connections might, if desired, be reversed. Then an increase in the differential pressure would cause an expansion of the bellows. In that case the lever 45 would have to move upwardly to close the micro-switch, and the control arm 55 would be swung downwardly to reduce the amount of differential pressure required to operate the lever 45.

In the embodiment of Figs. 4 to 12, one of the contacts of the micro-switch is permanently connected to a power line while from the other contact a conductor 48 leads to the relay 43. Each relay 43 and 44 has an armature with two switches operated as a unit. Suitable springs tend to maintain the switches in one extreme position while the energization of the relay magnets will bring them into the other position.

The circuit line from the relay 44 and from the two double arm switches are preferably all grouped into a single cable and pass outwardly from the casing 40 to the exterior as indicated at 99, Figs. 4 and 5. This same cable may contain the conductor leading permanently to the first terminal of the micro-switch. This consolidation of all the conductors leading from the box 40 simplifies the maintenance of the casing 40 in an air-tight condition, by the use of proper packing about the cable where it passes through the wall of the casing.

If I use but one of the differential pressure mechanisms in the system and couple it with the common suction pipe, as shown in Figs. 13 to 17, the pressure regulator then operates its micro-switch according to the general pressure conditions in the system rather than any one compartment. In that case, I arrange for the compartment where the shaking is first operated to automatically initiate the shaking in the next compartment, and so on until the bags in all of the compartments have been shaken.

It will be seen that whether I employ the selective system for controlling the shaking in each compartment according to the conditions therein, or the successive system to operate the whole set one after another according to the general pressure conditions, I employ in either case the differential pressure control actuated by the difference in pressure between the interior and the exterior of the bags.

I will now describe the operation of the system where each compartment has its own differential pressure unit controlled by conditions in that compartment, particular reference being had to Figs. 6 to 12 inclusive. In this individual-compartment operation, I employ a timing control for the circuits illustrated in Figs. 6 and 7. Such device comprises a casing 60 containing a standard 61 on which is mounted a synchronous motor 62, the armature shaft of which rotates two cams 63 and 64 which operate a pair of micro-switches 65 and 66. When current flows to the synchronous motor, the cams are rotated and thus operate the respective switches to close circuits which are normally open, as indicated in the left hand portion of Fig. 8.

This timing control, actuated by the micro-switch of my pressure control, is also intrinsically of my invention and is claimed herein independently of its operation in controlling the shaking mechanism of dust collector. The operation as I have applied it to dust collecting system will be presently described in connection with the summary of the operations, as illustrated in diagrams Figs. 8 to 12.

When the pressure differential in any compartment reaches a predetermined amount, the resulting contraction of the bellows in the corresponding control unit operates the associated micro-switch and thereby this through the conductor 48, Fig. 5, closes the circuit through the relay 43, and thereby initiates the electric operation which results eventually in the energization of the shaking mechanism.

We will now refer to Fig. 9 which shows by heavy lines the circuits which become operative upon the energization of the relay 43. This relay operates two switches 66 and 67 to swing them from the normal idle position of Fig. 8 to the position of Fig. 9. Current now flows as follows:

Tracing the circuit via the heavy lines in Fig. 9, this circuit passes from the power line designated plus via the line 70, thence to the line 71 to the micro-switch. The micro-switch being closed, the current passes by the connection 48 through the relay 43 to the line 49, thence via the switch 68 to the line 72, to the line 75, passing out at the power line designated minus. This results in the energization of the relay 43 which brings its two switches 66 and 67 into the position shown in Fig. 9. This causes the circuit through the line 48 to divide with parts passing via the line 76 and the switch 67 to the line 81 to the line 80 and thence through the synchronous motor of the timer and thence to the minus terminal.

When the synchronous motor 62 begins to operate it rotates the two cams 63 and 64 which will first close the switch 65. This operation brings into action the holding circuit illustrated in Fig. 10 to maintain the motor 62 energized irrespective of the condition of the pressure operated micro-switch. This is an important feature because when the shaking operation and air reversal, which the differential pressure controller initiated, start operation pressure conditions immediately change in that compartment and the bellows would soon return to idle position, opening the micro-switch, and such opening would stop the operation. This is prevented by the holding circuit.

Tracing the holding circuit, as indicated in Fig. 10, it passes from the plus line via the switch 65 to the line 80, thence to the line 81, through the closed relay switch 67, through the relay 43 to line 49, through the switch 68 to the line 72, to the line 75, and back to the minus power line.

It results from the above described holding circuit that the micro-switch is rendered idle and its condition is immaterial, but the timing motor continues to rotate its cams 63 and 64. The conditions at this time of the timer cams renders the electric system ready for the application of the paralyzing circuits indicated in Fig. 11.

As heretofore stated it is desirable to prevent shaking and air reversal in any compartment except the one being shaken, and the paralyzing circuits are provided to prevent the pressure control of any other compartment from acting while one compartment is acting. In the second embodiment I arranged the universal timer operated by the single pressure control to prevent actuation of the shaking mechanism in such other compartments but energize them automatically in succession throughout such remaining compartments.

The paralyzing circuit for the first embodiment is illustrated by the heavy lines in Fig. 11 which are those conductors and parts of Fig. 8 which are active at this time. Fig. 11 is on the assumption that the compartment designated No. 1 is the one in which the pressure control has acted and started the operation to result in the shaking of the bags in that compartment. At this time the shaking mechanism and the air reversing mechanism of all the other compartments must be held idle and this is the condition in compartments Nos. 2 and 3 shown in Fig. 11.

Tracing the circuits of Fig. 11, the circuit from the plus line divides, part passing through the switch 65 and the motor 62 to the minus line to maintain the motor operating. The other part of the circuit for compartment No. 1 passes via the line 70 to the line 71 to the line 84, through the switch 66 to the line 91 to the line 90 common to all the compartments.

From the line 90 the circuit continues in parallel for all of the compartments except No. 1. In the shown compartments Nos. 2 and 3, the circuit may be traced from the line 90 via the line 91 through the switch 66 to the line 92 through the relay 44 to the line 72 to the line 75 and back to the minus power line. Thus the condition in compartment No. 1 cannot be affected by changing pressure conditions either in it or in any of the other compartments, as all of their pressure controlled switches 42 are now cut out.

The situation just described brings into action the shaking of the circuit for compartment No. 1, shown in Fig. 12. Tracing the circuits in Fig. 12 the circuit from the plus line divides as before, one part continuing through the motor 62 and the other part passing via the line 70 to the line 71 to the line 95, thence through the solenoid 96 operating the valve 32, thence via the line 97 through the switch 69 of the relay 44 to the line 98, to the line 85, through the switch 66 now closed by the cam 64 and back to the minus line.

The circuit just described causes the shaking operation in compartment No. 1 and the reversal of the air current therein so long as the switch 66 continues closed. That is to say, air is admitted to the shaking cylinder 30 and also the cylinder 25 operating the air reversing valves 22, 24, with the result that the bags are shaken and the direction of the air current reversed in the compartment which has caused the actuation of the differential pressure controlling device.

When the synchronous motor 62 has rotated for a few seconds the cam 64 will have opened the switch 66, stopping the shaking operation. The cam 63 then opens the switch 65 and stops the motor and the normal or idle condition of all the compartments is restored, as shown in Fig. 8.

The embodiment of my system which I have specifically described with reference to Figs. 4 to 12 has the advantage that the bags in any compartment are cleaned as soon as they need cleaning while the rest of the compartments continue in operation without interruption. However, a simpler and hence cheaper adaptation of my system is illustrated herein in Figs. 13 to 17 inclusive, where, instead of initiating the cleaning in any compartment as soon as it needs it, I operate on the principle of the average need of the bags in all of the compartments. I effect this by providing one differential pressure controller for the entire system and coupling the relatively high pressure side of this with the hopper as heretofore described, but coupling the low pressure side to the main suction intake which is common to all of the compartments.

With the simpler system, whenever the internal bag pressure in the entire system, due to the accumulation of dust in the bags, reaches a certain excess over the pressure in the main suction line, which is the average external pressure in the compartments, then the differential pressure control acts to initiate the cleaning of the bags of one compartment and this is automatically followed by the cleaning of all the other compartments in sucecssion. Like the first described embodiment, the compartment being cleaned is the only one that is out of normal operation at any particular time.

Fig. 13 indicates the pressure controller designated 40*a* and comprises a closed casing containing the bellows and micro-switch, as before. 46*a* indicates the low pressure line from the interior of the bellows to the main suction outlet 21. 47 indicates the line from the interior of the air tight casing externally of the bellows to the hopper 5. The differential pressure controller in this instance is the same as to the bellows and micro-switch, as shown in Figs. 4 and 5, but the relays are omitted. I provide a timer, illustrated in Figs. 15, 16 and 17 comprising a shaft 100 carrying a series of adjustably positioned cams one for each compartment. The cams 101 on the shaft are preferably all alike. However, the first cam (designated 101*a*) controls a circuit different from the other cams, as hereinafter specifically described. Each cam operates its own micro-switch 102. The shaft 100 carries a worm wheel 103 meshing with a worm 104 on the armature shaft of a synchronous motor 105.

Each cam 101 is purely circular for the most part but has an arcuate gap 106. The micro-switch is normally open and its operating lever 45 bears on the periphery of the cam. The switch is thus maintained open so long as the main circular periphery of the cam engages the lever 45 but whenever the gap comes into registration with that lever the spring within the micro-switch depresses the lever and closes the switch.

To make the gap in the cam readily adjustable on the shaft, I provide the cam in the form of two discs side by side and each having its own hub 107 by which it is secured by a set screw 108 to the shaft. Each disc has its main circular periphery extending for at least half of the circumference, the rest of the periphery being of less radius. The discs are clamped on the shaft with the substantially semi-circular portions of larger radius overlapping at one region, while diametrically opposite this the portions of larger radius of the two discs are spaced apart arcuately, thus producing the gap 106. By this means the gap may be of any desired arcuate extent and also may be located in any position about the shaft. The result is that I can set the cams to operate the respective micro-switches in any order desired.

The timer just described is preferably contained in a normally closed casing 109 which is openable for the entire length of the contained apparatus, to allow access to the cams, motor and micro-switches whenever desired. Incidentally this casing contains a bus bar 110 for the ready attachment of the conductors to the respective micro-switches.

The circuits by which this particular apparatus actuates the shaking mechanism of the different compartments is illustrated in Fig. 14, in which the gaps of the cams is exaggerated for clearness of illustration. The line 111, which for convenience I have designed plus, leads to the micro-switch and from the micro-switch the line 112 leads through the field of the synchronous motor to the external minus line.

A branch line 113 leads first via the sub-branch 114 to the micro-switch 102a of the cam 101a and from the other terminal of this switch the line 115 leads to the minus line 112. This switch 102a is normally held open by the cam 101a which has a relatively long gap for closing. The enlarged portion to hold the switch open is illustrated conventionally by a short projecting portion 116. When the micro-switch 42 closes, by operation of the differential pressure regulator, the current passes through field of the synchronous motor and the motor begins to rotate and turn the cam shaft 100. The first result is that the projection 116 on the special cam 101a releases the lever of the micro-switch 102a so that it closes and this maintains the circuit through the motor irrespective of the pressure control device.

Now as the shaft 100 continues to rotate one cam 101 after another causes its gap to release the corresponding micro-switch 102. Circuits are thus established in succession via the line 113 and the line 120 to the line 121 and thence through the solenoid 96 controlling the valve 32 which admits operating compressed air to the shaking cylinder 30 operating the bag support, and also operates the reversing valve 25, the same as in the description already given.

It results from the mechanism and circuits just described that the shaking in the first compartment, with the accompanying reversal of its air valve, starts immediately after the closing of the holding circuits 114 and 115 by the special cam 101a. When the gap of the first compartment cam turns beyond its micro-switch lever it opens that switch and the shaking operation in the first compartment ceases. Its air valve returns to normal position and its normal dust-collecting operation resumes. Immediately thereafter the next cam 101 operates to close its micro-switch and the shaking and air reversal takes place in the second compartment and so on through each of the compartments.

It will be seen that whether I employ the individual compartment control first described or the simpler form last explained, in each case, the operation is initiated by the difference in pressure on the inside and the outside of the bags. This initiation results in both embodiments in the shaking of the bags and air reversal of one compartment at a time. In the first described embodiment the compartments are cleaned one after another in any order, as the condition of their bags determines; whereas in the second embodiment the cleaning starts when the average condition throughout the system requires it, and then takes place successively in one compartment after the other in a predetermined order. It is convenient to have this order from the first compartment directly to the last but the compartments in this second embodiment may be shaken in any desired order according to the settings of the cams for those compartments.

I claim:

1. In a dust collector, the combination of a series of individual compartments, a set of fabric filtering bags in each compartment, a hopper below the various bags with which the interior of the bags communicate, mechanism in each compartment for movably supporting the upper ends of the bags and adapted to be operated to shake them, a separate control device submitted to the air pressures on the interior and exterior of the bags in each compartment, and means whereby the operation of such shaking mechanism in each compartment is selectively controlled by the differential pressure in the corresponding control device when it reaches a predetermined amount.

2. In a dust collector, the combination of a set of compartments, a common hopper beneath the various compartments, a set of fabric bags in each compartment, the interior of the bags being in open communication with the hopper, a suction conduit communicating with the upper end of each compartment, whereby dust-laden air may enter the interior of the bags and clean air may pass from the exterior thereof, individual means in each compartment for reversing the direction of flow of the air so that it shall be from the exterior of the bags therein to the interior, a controlling device submitted to the difference in pressure between the interior and exterior of the bags, and means whereby said controlling device when the difference in pressure reaches a predetermined amount selectively actuates the reversing mechanism in each compartment to change the direction of the air in the corresponding compartment.

3. A dust collecting system having a series of compartments each containing a filtering wall with means for admitting dust-laden air to one side of the wall and withdrawing clean air from the other side of the wall, a series of pressure controlled devices, one for each compartment, submitted to the air pressures on opposite sides of the wall in that compartment and operated whenever such differential pressure reaches a predetermined amount to actuate means to clean the fabric wall.

4. In a dust collecting system, the combination of a series of compartments, a common hopper beneath the compartment, a set of bags in each compartment, the interiors of which communicate with the hopper, means for admitting dust-laden air to the hopper to pass to the interior of the bags and means for withdrawing air from the exterior of the bags in the compartments, a series of mechanisms for shaking the bags in the different compartments respectively, a series of controlling devices one for each compartment, said controlling device having means operated by the difference in pressure between the exterior and the interior of the bags in the compartment, and means actuated by said differential pressure means to initiate the operation of the shaking mechanism for that compartment.

5. A dust collecting system having a series of compartments, a common hopper beneath the compartments, a set of fabric filtering bags in each compartment with the interior of the bags in communication at their lower ends with the hopper, shaking means supporting the upper ends of the bags, power mechanism for operating said shaking means, a differential pressure controlling device for each compartment, each controlling device having an expansible and contractible bellows within a closed casing, two conduits from each controlling device, one of said conduits communicating with the space within the bellows and the other with the space within the casing outside of the bellows, one of said conduits communicating with the hopper and the other with the compartment space outside of the bags, and means whereby the movement of the bellows initiates the operation of the corresponding shaking means.

6. A dust collecting system having a series of compartments, a common hopper beneath the compartments, a set of filtering bags in each compartment with the interior of the bags in communication at their lower ends with the hopper, a series of mechanisms for cleaning the bags, a differential pressure controlling device for each compartment, each said device having a closed casing containing an expansible and contractible bellows, two conduits from each controlling device, one leading to the interior of the bellows and the other to the casing space outside of the bellows, one of said conduits communicating with the hopper, the other with the compartment space outside of the bags, means whereby the movement of the bellows initiates the operation of the corresponding cleaning means, and means whereby the operation of the cleaning means of all the other compartments is maintained idle irrespective of the pressure conditions within such compartments while the bags in one compartment are being shaken.

7. In a dust collecting system, the combination of a series of compartments each having a set of fabric bags, means for admitting dust-laden air to the interior of said bags, means for withdrawing the air from each compartment externally of the bags therein, a set of normally idle mechanisms, one for each compartment for cleaning the bags, a differential pressure-controlling device one for each compartment, said controlling device having a closed casing containing an expansible and contractible bellows, two conduits leading respectively to the interior of the bellows and to the interior of the casing outside of the bellows, one of such conduits communicating with the interior of the bags, the other conduit communicating with the space within the compartment externally of the bags, a micro-switch in each differential pressure casing actuated by the movement of the bellows in such casing, individual mechanisms for shaking the bags in the different compartments, an electro-magnetic device for each shaking mechanism controlling its operation, a circuit connecting the micro-switch with the electromagnetic means, and circuits controlled by actuation of any micro-switch to prevent the actuation of the electro-magnetic means of the other compartments irrespective of the condition of the differential pressure controls of such other compartments.

8. In a dust collecting system, the combination of a series of compartments each having a filtering wall, means for admitting dust-laden air to each compartment on one side of the wall, means for withdrawing clean air from each compartment on the other side of the wall, a set of mechanisms one for each compartment for cleaning the filtering wall, a set of pressure control devices one for each compartment, each such device containing movable means submitted to the pressure on opposite sides of said wall and operated by such differential pressure when it reaches a predetermined amount, each pressure control having an electric switch actuated thereby, a timing circuit containing an electric motor under the control of the said switch, electro-magnetic means individual to each compartment for actuating the cleaning mechanism thereof, circuits from said timing device to all of the said electro-magnetic means, whereby the micro-switch controls the timer and the timer may initiate the shaking mechanism of the compartment whose pressure control device has operated, and a paralyzing circuit controlled by said timer and operating to prevent the completion of the shaking circuits to the shakers of any other compartment while one compartment is being shaken.

9. In a dust collecting system, the combination of a compartment having a plurality of containers each with a wall substantially pervious to air but impervious to dust, means for conducting dust-laden air to the interior of each container, means for conducting clean air from the exterior of each container, means for cleaning the wall in each container of dust clinging thereto, and means selectively operated by the difference in air pressure on opposite sides of the wall in each container to selectively initiate the operation of the cleaning means in each container in response to the difference in air pressure in the corresponding container.

10. In a dust collector, the combination of a compartment, a plurality of containers therein each having a fabric filtering wall, means for conducting dust-laden air to one side of the wall in each container, means for withdrawing air from the other side of the wall in each container, independent means for cleaning the dust from the first-mentioned side of each wall, a device submitted to the differential pressure between the opposite sides of the wall in each container and actuated when the pressure in any container reaches a predetermined amount to automatically condition the cleaning means in that container for operation, and means automatically and selectively initiating the operation of the preconditioned cleaning means in each container.

11. In a dust collector, the combination of a plurality of compartments each containing a set of fabric filtering bags, means for admitting dust-laden air to the interior of the bags, means for removing clean air from the compartments externally of the bags, an independent differential pressure control device operatively coupled to each compartment and having an air tight casing with a bellows and a microswitch adapted to be actuated thereby, conduits leading from the interior of each casing externally of the corresponding bellows and from the interior of each bellows to the interior and exterior of the corresponding bags, independent power mechanism for shaking the bags and for changing the direction of the air current in each individual compartment, electro-magnetic means for conditioning each power mechanism for operation, a circuit connecting said electro-magnetic means with each micro-switch, and other electro-magnetic means coupled to said first-mentioned electro-magnetic means for selectively initiating the operation of the power mechanism in each compartment while preventing such operation in other compartments.

WALTER BRUCKNER.

REFERENCES CITED

The following references are of record in the file of this patent:

UNITED STATES PATENTS

| Number | Name | Date |
|---|---|---|
| 692,779 | Brush | Feb. 4, 1902 |
| 1,715,273 | Billings | May 28, 1929 |
| 1,974,952 | Eiben | Sept. 25, 1934 |
| 2,014,298 | Schneible | Sept. 10, 1935 |
| 2,047,908 | Newhouse et al. | July 14, 1936 |
| 2,057,578 | Kleissler | Oct. 13, 1936 |
| 2,318,395 | Hornbrook | May 4, 1943 |
| 2,449,953 | Rippingille | Sept. 21, 1948 |

FOREIGN PATENTS

| Number | Country | Date |
|---|---|---|
| 368,731 | Great Britain | Mar. 1, 1932 |